United States Patent [19]

Nakamura et al.

[11] Patent Number: 4,465,487
[45] Date of Patent: Aug. 14, 1984

[54] CONTAINER FOR MEDICAL USE

[75] Inventors: Hideki Nakamura; Toshinobu Ishida; Takao Yoshida, all of Tokyo, Japan

[73] Assignee: Terumo Kabushiki Kaisha, Tokyo, Japan

[21] Appl. No.: 384,189

[22] Filed: Jun. 3, 1982

[30] Foreign Application Priority Data

Jun. 16, 1981 [JP] Japan .................. 56-92534

[51] Int. Cl.³ ............................................. A61M 5/14
[52] U.S. Cl. ........................................ 604/408; 383/9; 428/35
[58] Field of Search .................. 229/53; 150/1; 215/DIG. 3; 604/408, 415; 428/35; 383/9

[56] References Cited

U.S. PATENT DOCUMENTS

| | | | |
|---|---|---|---|
| 3,519,158 | 7/1970 | Anderson | 150/1 |
| 3,576,650 | 4/1971 | Underwood et al. | 604/408 |
| 4,023,607 | 5/1977 | Jensen et al. | 150/1 |
| 4,112,989 | 9/1978 | Grode et al. | 150/1 |
| 4,286,597 | 9/1981 | Gajewski et al. | 604/408 |

Primary Examiner—William R. Dixon, Jr.
Attorney, Agent, or Firm—Frishauf, Holtz, Goodman & Woodward

[57] ABSTRACT

A collapsible container for medical use which has an improved low temperature characteristics and can withstand high temperatures of high-pressure steam sterilization, includes a container main body made by irradiating a hollow molding having a desired shape formed of an ethylene-vinyl acetate copolymer with an electron beam to cross-link the copolymer, thus providing a main body. The main body is completely sealed at its periphery except for a predetermined portion providing a non-sealed portion. The end of a functional accessory for achieving the function of the container for medical use is inserted in the non-sealed part of the main body. The accessory is sealed, at the inserted end, to the main body through an interlayer of a non-cross-linked ethylene-vinyl acetate copolymer.

17 Claims, 4 Drawing Figures

CONTAINER FOR MEDICAL USE

BACKGROUND OF THE INVENTION

I. Field of the Invention

The present invention relates to a container for medical use and, more particularly, to a container for medical use suitable for use in a closed medical system.

II. Description of the Prior Art

A closed medical system has been recently used in medical treatments such as blood donation, blood transfusion, or fluid therapy so as to prevent contact of a liquid handled (e.g., blood or a liquid medicine) with the outer environment. A container for medical use to be used in such a system must be able to transfer the liquid by means of gravity and the flexibility of the container material. The container is therefore generally made of a soft plastic. In order to keep the liquid sterile, the container for medical use of this type must be subjected to high-pressure steam sterilization and must therefore have heat resistance to withstand the high temperature of the steam. A container for medical use is frequently used to hold blood in a frozen state (at $-80°$ C.) for storage. Therefore, the container must also be resistant to low temperatures especially below freezing temperatures.

Plastics with good flexibility include soft polyvinyl chloride, ethylene-vinyl acetate copolymers, or the like. However, in view of the necessity of high-pressure steam sterilization, soft polyvinyl chloride is superior to the ethylene-vinyl acetate copolymers which are unable to withstand the high temperature of the steam.

However, soft polyvinyl chloride is inferior in resistance to low temperatures compared to ethylene-vinyl acetate copolymers and also contains a large amount of a plasticizer.

Thus, conventional containers for medical use do not simultaneously meet the requirements of resistance to high and low temperatures and involve the problem of elution of additives such as plasticizer. Therefore, it has been strongly desired that there be provided a container for medical use which has both resistance to high and low temperatures and which is also safe to use in medical applications.

SUMMARY OF THE INVENTION

It is an object of the present invention to provide a container for medical use, which simultaneously has resistance to high temperatures involved in high-pressure steam sterilization and resistance to low temperatures and which is safe to use in medical applications.

It is another object of the present invention to provide a container for medical use which is flexible.

It is still another object of the present invention to provide a container for medical use which provides an excellent barrier against water vapor.

It is still another object of the present invention to provide a container for medical use which is excellent in transparency.

It is still another object of the present invention to provide a container for medical use which does not present the problem of elution of additives therein.

In order to achieve these and other objects, there is provided according to the present invention a flexible and collapsible container for medical use which has an improved low tempeeature characteristics and can withstand high temperatures of high-pressure steam sterilization, comprising:

a container main body made by irradiating a hollow molding having a desired container shape formed of an ethylene-vinyl acetate copolymer with an electron beam to cross-link the copolymer, said main body being completely sealed at its periphery except for a predetermined portion providing a non-sealed portion; and a functional accessory for achieving the function of the container, having its one end inserted in the non-sealed portion of the main body, said accessory being sealed to the main body at the inserted end through an interlayer of a non-cross-linked ethylene-vinyl acetate copolymer.

The molding can be formed by sealing a pair of sheets formed of the copolymer or a flat tube formed of the copolymer. Alternatively, the molding can be made by blow-molding the copolymer.

In general, the ethylene-vinyl acetate copolymer of the main body contains 10 to 35% by weight of vinyl acetate and is crosslinked to have a gel content of 50 to 80% by weight. This main body preferably has a wall thickness of 0.1 to 0.6 mm.

The ethylene-vinyl acetate copolymer of the interlayer preferably contains 15 to 40% by weight of vinyl acetate.

The accessory preferably consists of a polymeric material which has heat resistance to withstand high-pressure steam sterilization and which shows a blocking or adhesive characteristic to the ethylene-vinyl acetate copolymer at high temperatures. Such a polymeric material is usually selected from the group consisting of a high-density polyethylene and a mixture thereof with an ethylene-vinyl acetate polymer, and a polypropylene and a mixture thereof with an ethylene-vinyl acetate copolymer. The ethylene-vinyl acetate copolymer in the mixtures generally has a vinyl acetate content of 15 to 40% by weight. The former mixture contains the ethylene-vinyl acetate copolymer up to 80% by weight, while the latter mixture contains the same up to 85% by weight.

The accessory to be mounted to the main body includes an outlet port or the like.

DETAILED DESCRIPTION OF THE PREFERRED EMBODIMENTS

Figure 1A:
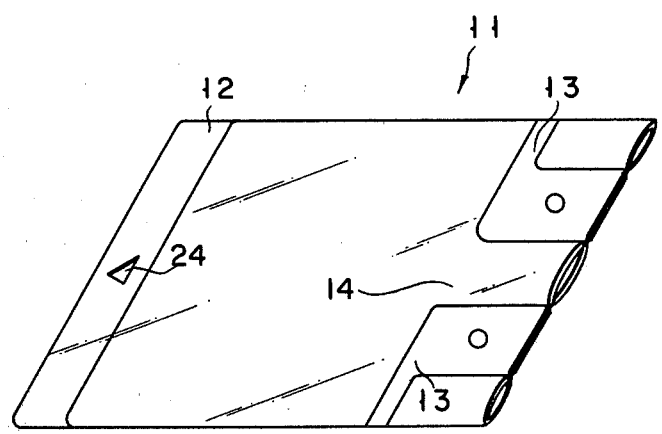
FIGS. 1A, 1B and 2 are views illustrating a method for manufacturing a container for medical use according to the present invention in sequential order.

The present inventors have made extensive studies for the purpose of providing a flexible container for medical use suitable for use in closed medical systems. For the reasons of no elution and excellent resistance to low temperatures, an ethylene-vinyl acetate copolymer is selected as the material for the container main body. The ethylene-vinyl acetate copolymer (to be referred to as an EVA copolymer hereinafter) preferably has a vinyl acetate content of 10 to 35% by weight. When this content is below 10% by weight, the EVA copolymer is lowered in transparency which is one of the important factors for a container for medical use. When transparency is high, the liquid content of the container can be easily observed and foreign materials in the liquid content can be detected. In addition when the vinyl acetate content is below 10%, another important factor, flexibility is also degraded. The flexibility is important for the purpose of transferring the liquid with the help of gravity and flexibility of the container. Thus, such a container having such a low content of vinyl acetate is impaired in its collapsibility; it does not become flat due to atmospheric pressure as the liquid content is reduced. Furthermore, when the vinyl acetate content of the EVA copolymer is below 10% by weight, adherability by high-frequency is extremely lowered. On the other hand, if the vinyl acetate content exceeds 35% by weight, the permeability of water vapor increases (water vapor barrier characteristic is degraded), although transparency, flexibility and high-frequency adherability are improved. When the water vapor permeability increases, evaporation of the liquid inside the container increases. Then, in the case of storage over a long period of time, the concentration of blood or liquid medicine stored tends to change.

The thickness of the container main body of the EVA copolymer also has significant influences on the transparency, flexibility, and water vapor permeability. When the thickness of the container main body is excessively small, the water vapor permeability increases and the body may be damaged upon handling. For these reasons, the container main body of the container for medical use of the present invention desirably has a thickness of 0.1 to 0.6 mm, preferably, 0.3 to 0.5 mm.

Although an EVA copolymer has excellent resistance to low temperatures, it may not have satisfactory heat resistance to withstand high-pressure steam sterilization or steam autoclaving (in general, the sterilization is conducted in saturated steam at 115° to 121° C. for 15 to 45 minutes) even if it has the above-noted properties. In other words, it may be subject to peeling off, deformation, melting during the sterilization. In order to prevent this, according to the present invention, the EVA copolymer is subjected to a certain ionizing radiation to cross-link the EVA copolymer, providing it with the desired heat resistance. It has also been found that optimal heat resitance may be obtained by performing cross-linking to such an extent that the cross-linked EVA copolymer has the gel content of about 50% or more. The gel content used herein indicates the percentage of the weight of the cross-linked EVA copolymer to the weight of insolubles with hot xylene.

Ionizing radiation may be obtained by gamma rays, a high-energy electron beam, or the like. However, the gamma rays generally have a low exposure dose rate and are unable to provide a high gel content in the case of radiation in air. For this reason, the high-energy electron beam is selected in the present invention. A high-energy electron beam may be obtained by a Van de Graaff-type accelerator or linear accelerator which provides a high exposure dose rate (generally several Mrad/sec), which is variable, and can provide the desired gel content by radiation in air for several seconds. Therefore, this high-energy electron beam allows continuous radiation of sheet-like materials and is suitable for mass-production. However, the high-energy electron beam is limited in its transmissivity and is not suitable for radiation of a material with great thickness or of complex shape. For this reason, it is preferable to radiate a flat and relatively thin sheet with such a high-density electron beam as in the case of the present invention. The flat shape of the empty container is also preferable from the viewpoint of collapsibility as described above.

Upon radiation with such an electron beam, resistance to low temperatures of the EVA copolymer is also improved. It is expected that freezing for storage of blood components or blood precipitates will be performed more frequently in the future. According to the standards recommended by the WHO, plasma is frozen in a freezer at −40° C. or lower or is frozen using a mixture of dry ice with an organic solvent such as an alcohol. According to Japan Red Cross, a cryoprecipitate is formed according to the following procedure. Plasma is frozen at −20° C. or lower, and is thawed at 5° C. After centrifugation, the supernatant liquid is removed with about 20 ml remaining. The remaining portion of the plasma is mixed and is frozen at −20° C. or lower and is stored in a refrigerator. By radiation of the EVA copolymer with a high-speed electron beam, the copolymer exhibits satisfactory resistance to high and low temperatures and may not be damaged by low temperatures.

As has been described above, the EVA copolymer is cross-linked so that the gel content may be about 50% or higher, according to the present invention. However, it is difficult to adhere EVA copolymers having such cross-linking degrees with each other. When EVA copolymers having a cross-linking degree of 50% or higher are superimposed on each other and are subjected to high-frequency adhesion, they appear to be adhered securely at first sight. However, when they are reheated in warm water or the like, they easily peel off from each other since they tend to return to the original shapes prior to radiation with an electron beam. In order to prevent this problem, a pair of sheets or a flat tube of an EVA copolymer are sealed first and then are radiated with an electron beam to provide the container main body. Alternatively, the main body may be made by the irradiation with the electron beam of a blow molding.

The main body of the container for medical use of the present invention is thus provided. However, this alone may not function as a container for medical use. In order to fully function as a container for medical use, plastic accessories such as an outlet port and other tubes must be attached. The plastic material of these accessories must have some flexibility and must be able to withstand high-pressure steam sterilization.

It is difficult to mount accessories as described above to the container main body of a cross-linked EVA copolymer as described above. In fact, as an example, an outlet port of a high-density polyethylene was inserted into one end of a container main body of a cross-linked EVA copolymer, and was adhered by high-frequency adhesion. Physiological saline solution was poured in this container which was then subjected to high-pressure steam sterilization after sealing with a stopper. As a result, the outlet port completely separated from the container main body. It may be possible to mount the outlet port directly to the main body and then to cross-link the EVA copolymer by radiation with an electron beam. However, as has been described above, the electron beam has a limited transmissivity. Thus, the electron beam is shielded by the accessory with a relatively large thickness, and the sheet at the opposite side may not be sufficiently cross-linked.

The present inventors have made various studies for securely mounting the accessories to the container main body of the cross-linked EVA. When a pair of sheets, a tube or blow molding of the EVA copolymer is sealed into a shape of a container main body, a non-sealed portion is formed through which the end of the accessory may be inserted. Cross-linking is terminated at some point such that the gel content is up to 85% (not less than 50%). Thereafter, the accessory is sealed by high-frequency adhesion or the like through an interlayer of non-cross-linked EVA copolymer. Then, the accessory may be securely attached, providing at the same time heat resistance to withstand high-pressure steam sterilization.

In order to fully perform mounting of the accessory, it is extremely preferable that the gel content of the cross-linked EVA copolymer to form the container main body be 85% or less (50% or more) and that the following conditions be satisfied:

(1) The content of vinyl acetate in the non-cross-linked EVA copolymer of the interlayer is 15 to 40% by weight. When this content is below 15% by weight, adhesion is poor. On the other hand, when the content exceeds 40% by weight, the adhered layer tends to flow during high-pressure steam sterilization leaving almost no necessary adhesive layer, and the accessory tends to be easily separated. The content of vinyl acetate is preferably 20 to 30% by weight.

(2) The accessory is made of a material which has heat resistance (may not deform) to withstand high-pressure steam sterilization and which has a blocking tendency to the EVA copolymer at high temperatures. When factors to safety (sterilness), cost and so on are considered, high-density polyethylene or polypropylene are suitable. When with this polymeric material is blended a non-cross-linked EVA copolymer having a vinyl acetate content of 15 to 40% by weight, adhesion is improved further. The mixing ratio of the high-density polyethylene to the EVA copolymer is preferably 100:0 to 20:80 based on the weight. On the other hand, the mixing ratio of the polypropylene to EVA copolymer is preferably 100:0 to 15:85 based on the weight.

The container for medical use of the present invention will now be described with reference to the accompanying drawings, together with a method for manufacturing the same.

Figure 1B:
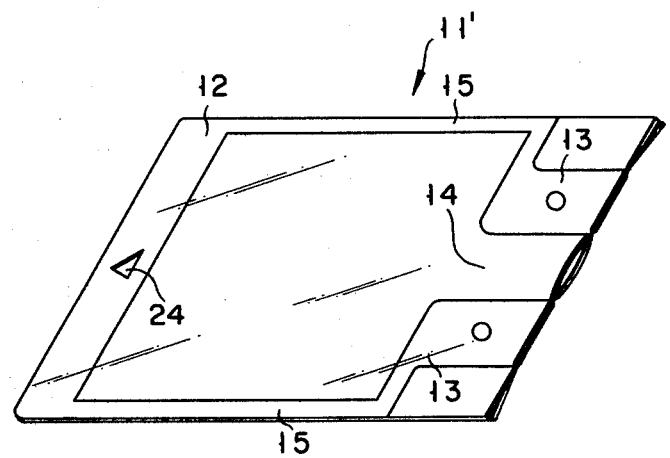

As shown in FIG. 1A, an EVA copolymer tube 11 prepared by inflation molding is sealed by high-frequency induction heating or the like to provide a container main body. Sealing is performed only at a bottom side end 12 and an upper side end 13, providing a non-sealed portion 14 for insertion of an accessory to be described later. A similar molding may be obtained by blow molding. Alternatively, a pair of EVA copolymer sheets 11' formed by extrusion are superposed on each other. The bottom side end 12, the upper side end 13 and a side end 15 are sealed by high-frequency induction heating, leaving the non-sealed portion 14 as shown in FIG. 1B.

The EVA copolymer molding of desired shape is then radiated with an electron beam at a dose of 5 to 20 Mrad to cross-link the EVA copolymer so that the desired gel content may be obtained.

Figure 2:
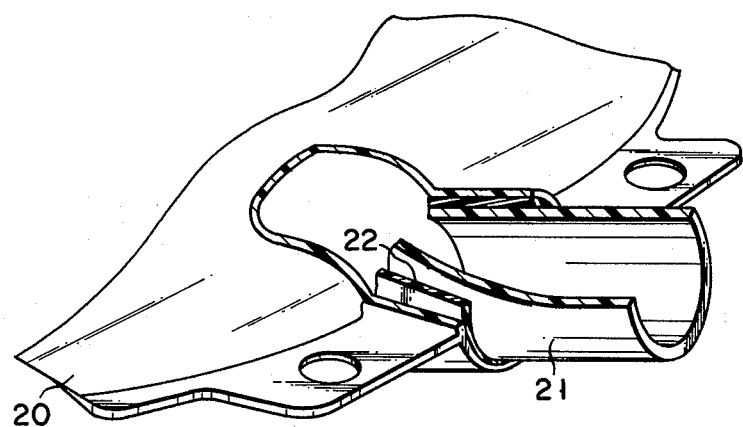
Figure 3:
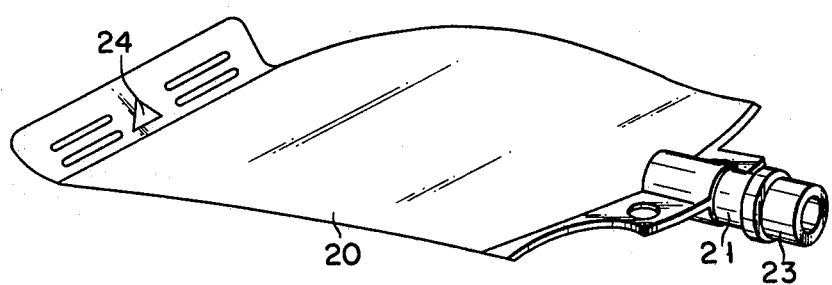
FIG. 3 is a perspective view of the container for medical use according to the present invention.

Referring to FIG. 2, a short tube 22 as an interlayer of a non-cross-linked EVA copolymer is placed over one end portion of an outlet port 21 as an accessory to be mounted on a container main body 20. The outlet port 21 with the short tube 22 attached thereto is inserted into the container main body so that it may be brought into contact with the non-sealed portion of the container main body. Then, the accessory is adhered by high-frequency induction heating to provide a container for medical use as shown in FIG. 3. A cap 23 may be placed on the outlet port 21. A through hole 24 for suspending the container is conveniently formed in the bottom side sealed portion of the container.

The present invention will now be described by way of its examples.

EXAMPLE 1

An EVA copolymer with a content of vinyl acetate being 15% by weight was inflation molded into a flat tube having a lay-flat width of 130 mm and a thickness of 0.4 mm. The EVA copolymer tube was sealed into a desired container shape, leaving a non-sealed portion (lay-flat width of 130 mm and length of 10 mm) as shown in FIG. 1A. Thereafter, the EVA copolymer tube was radiated with an electron beam (dose of 15 Mrad) for cross-linking the copolymer so as to achieve a gel content of 80%, thus obtaining a container main body having a capacity of 500 ml.

A short tube (15 mm outer diameter, 13 mm inner diamter, and 10 mm length) of a non-cross-linked EVA copolymer having a vinyl acetate content of 25% by weight was placed over one end of an outlet port (13 mm outer diameter, 10 mm inner diameter, and 25 mm length) of a polymeric material as shown in Table 1 below. As shown in FIG. 2, the outlet port with the short tube was inserted into the non-sealed portion of the container main body, and then was adhered by high-frequency induction heating to provide a container for medical use.

Physiological saline solution was poured in the container in an amount of 500 ml. A film of a high-density polyethylene of 0.1 mm thickness was adhered to the outer end of the outlet port to seal the container, and a rubber stopper was placed thereover. The container holding the solution thus obtained was subjected to high-pressure steam sterilization of a 121° C. for 30 minutes, and the state of the outlet port was observed.

TABLE 1

| Material No. | EVA[1] | HDPE[2] | PP[3] |
|---|---|---|---|
| 1 | 0 | 100 | 0 |
| 2 | 0 | 0 | 100 |
| 3 | 60 | 40 | 0 |
| 4 | 60 | 0 | 40 |
| 5 | 80 | 20 | 0 |
| 6 | 85 | 0 | 15 |
| 7 | 90 | 10 | 0 |
| 8 | 90 | 0 | 10 |

[1]EVA: Ethylene-vinyl acetate copolymer containing 20% by weight of vinyl acetate
[2]HDPE: High-density polyethylene (MFR = 5.5)
[3]PP: Polypropylene (MFR = 11)

Although the adhered part moved by about 2 mm there was no deformation of the outlet port with materials of Nos. 1 and 2 (the outlet port was shifted to the side of the outer end). There was no leakage of the contents and the outlet ports presented no problem in fluid therapy. With the outlet ports of materials of Nos. 3 to 6, adhesion was good and the outlet ports caused no leakage of content and deformation. With the outlet ports of materials of Nos. 7 and 8, although adhesion was good, the outlet ports collapsed and thus presented a problem in fluid therapy.

Further the same test was conducted except that a non-cross-linked EVA copolymer short tube used contains 40% by weight of vinyl acetate. This time, the similar results were obtained.

EXAMPLE 2

Using the same materials and procedures as in Example 1, container main bodies of 500 ml capacity were obtained which consisted of a cross-linked EVA copolymer having a gel content of 80%.

An outlet port was adhered to the non-sealed portion (17 mm lay-flat width, and 10 mm length) in the same manner as in Example 1. The materials of the outlet port used were Nos. 3 and 4 of Example 1. The short tubes used were made of an EVA copolymer containing 15% by weight of vinyl acetate.

After pouring 500 ml of physiological saline solution as in Example 1, the container was sealed and subjected to high-pressure steam sterilization as in Example 1.

None of the containers caused deformation of the outlet port or leakage of the contents. However, peeling occurred to about 3 mm from the inner side of the adhered portion. However, this presented no problem in fluid therapy.

COMPARATIVE EXAMPLE 1

Using the same materials and procedures as in Example 1, container main bodies of 500 ml capacity were manufactured which consisted of a cross-linked EVA copolymer having a 80% gel content.

Outlet ports (25 mm length) of materials of Nos. 3 and 4 in Table 1 were inserted into the non-sealed portions (17 mm lay-flat width, and 10 mm length). They were adhered by high-frequency induction heating. After pouring 500 ml of physiological saline solution as in Example 1, the containers were sealed and were covered with rubber stoppers.

When these containers were collapsed, leakage of the contents through the outlet ports or peeling off of the adhered part were not observed.

When the containers were subjected to high-pressure steam sterilization at 121° C. for 30 minutes, the outlet ports were completely separated, and most of the physiological saline solution leaked out through the adhered portions of the outlet ports.

EXAMPLE 3

Containers of the present invention were manufactured using an EVA copolymer which contained 20% by weight of vinyl acetate. Similar containers were also manufactured from a non-cross-linked EVA copolymer of the same kind and from polyvinyl chloride. Water was poured in each of these containers in the amount of 600 ml each and the containers were sealed. The containers were immersed in dry ice-ethanol ($-72°$ C.), the polyethylene bags or directly. They were left to stand in this condition for one hour to freeze the water. These containers were then dropped from various heights, shown in Table 2 below, on a floor with linoleum tiles. The states of the respective containers were observed to test resistance to low temperatures. The obtained results are shown in Table 2.

TABLE 2

| Height (cm) | Present Invention | | Non-cross-linked EVA | | Polyvinyl Chloride | |
|---|---|---|---|---|---|---|
| | In Bag | Directly Immersed | In Bag | Directly Immersed | In Bag | Directly Immersed |
| Sample No. | 3 | 2 | 3 | 2 | 2 | 3 |
| 0 | 0 | 0 | 0 | 2 | 0 | 1 |
| 30 | 0 | 0 | 0 | | 0 | 0 |
| 50 | 0 | 0 | 0 | | 0 | 2 |
| 80 | 0 | 0 | 0 | | 0 | |
| 100 | 0 | 0 | 0 | | 2 | |
| 120 | 0 | 0 | 0 | | | |
| 150 | 0 | 0 | 3 | | | |
| 200 | 0 | 0 | | | | |
| 260 | 0 | 0 | | | | |
| 290 | 3 | 2 | | | | |

(Note) Numbers indicate the number of containers damaged in each column.

As may be seen from the results shown in Table 2 above, the containers for medical use according to the present invention have improved resistance to low temperatures.

In summary, the containers for medical use according to the present invention have heat resistance to withstand high-pressure steam sterilization and improved resistance to low temperatures. At the same time, the containers have excellent flexibility and collapsibility which is preferable for use in closed medical systems, and are suitable for medical treatments in closed medical systems such as blood collection, separation of blood components, fluid therapy or the like. The containers for medical use according to the present invention also have excellent transparency which allows easy detection of foreign materials in the contents or separation of blood components. Since the containers for medical use of the present invention do not contain additives such as a plasticizer or a stabilizer, they may not ellute into the contents. Since the containers for medical use of the present invention have high water vapor barrier characteristic, a change in the concentration of the content (liquid medicine, blood) is small, and the contents may be stored for a long period of time in a stable manner. Since all sealing operations can be performed by high-frequency means and do not involve any solvent, the containers are safe for medical use.

What we claim is:

1. A flexible and collapsible container for medical use which has an improved low temperature characteristic and can withstand high temperatures of high-pressure steam sterilization, comprising:

a container main body made by irradiating a hollow molding having a desired container shape, formed of an ethylene-vinyl acetate copolymer containing 10 to 35% by weight of vinyl acetate, with an electron beam to cross-link the copolymer whereby said cross-linked copolymer has a gel content of 50 to 85% by weight, said container main body being completely sealed at its periphery except for a predetermined portion providing a non-sealed portion;

a functional accessory for achieving the function of the container, having an end portion inserted in the non-sealed portion of the container main body, said functional accessory being made of a polymeric material, and having sufficient heat resistance to withstand high-pressure steam sterilization; and an interlayer for sealing said container main body at the non-sealed portion thereof to the inserted end portion of said functional accessory, said interlayer being made of a non-cross-linked ethylene-vinyl acetate copolymer containing 15 to 40% by weight of vinyl acetate.

2. The container according to claim 1 wherein the molding is formed by sealing a pair of sheets formed of the copolymer or a flat tube formed of the copolymer.

3. The container according to claim 1 wherein the molding is made by blow-molding the copolymer.

4. The container according to claim 1, wherein the container main body has a thickness of 0.1 to 0.6 mm.

5. The container according to claims 1, 2, 3, or 4 wherein the polymeric material adheres to the ethylene-vinyl acetate copolymer at high temperatures.

6. The container according to claim 5, wherein the polymeric material is a member selected from the group consisting of a high-density polyethylene, a first mixture of a high-density polyethylene and and ethylene-vinyl acetate copolymer, a polypropylene and a second mixture of a polypropylene and an ethylene-vinyl acetate copolymer.

7. The container according to claim 6, wherein the first mixture contains not more than 80% by weight of the ethylene-vinyl acetate copolymer.

8. The container according to claim 7, wherein the ethylene-vinyl acetate copolymer in the first mixture contains 15 to 40% by weight of vinyl acetate.

9. The container according to claim 6, wherein the second mixture contains not more than 85% by weight of the ethylene-vinyl acetate copolymer.

10. The container according to claim 9, wherein the ethylene-vinyl acetate copolymer in the second mixture contains 15 to 40% by weight of vinyl acetate.

11. The container according to claim 4, wherein the container main body has a thickness of 0.3 to 0.5 mm.

12. The container according to claim 1, wherein the amount of vinyl acetate in said non-cross-linked ethylene-vinyl acetate copolymer is 20 to 30% by weight.

13. A flexible and collapsible container for medical use which has an improved low temperature characteristic and can withstand high temperatures of high-pressure steam sterilization, comprising:

a container main body having a thickness of 0.1 to 0.6 mm made by irradiating a hollow molding having a desired container shape, formed of an ethylene-vinyl acetate copolymer containing 10 to 35% by weight of vinyl acetate, with an electron beam to cross-link the copolymer whereby said cross-linked copolymer has a gel content of 50 to 80% by weight, said main body being completely sealed at its periphery except for a predetermined portion providing a non sealed portion;

a functional accessory for achieving the function of the container, having an end portion inserted in the non-sealed portion of the main body, said functional accessory being made of a polymeric material selected from the group consisting of high density polyethylene; a first mixture containing a high density polyethylene and an ethylene-vinyl acetate copolymer wherein the amount of the ethylene-vinyl acetate copolymer is not more than 80% by weight; a polypropylene; and a second mixture containing a polypropylene and an ethylene-vinyl acetate copolymer wherein the amount of the ethylene-vinyl acetate copolymer is not more than 85% by weight, and wherein the amount of vinyl acetate in the copolymer of each of the first and second mixture is from 15 to 40% by weight, said polymeric material having sufficient heat resistance to withstand high-pressure steam sterilization and which adheres to the ethylene-vinyl acetate copolymer of the container main body at high temperatures; and an interlayer for sealing said container main body at the non-sealed portion thereof to the inserted end portion of said functional accessory, said interlayer being made of a non-cross-linked ethylene-vinyl acetate copolymer containing 15 to 40% by weight of vinyl acetate.

14. The container according to claim 13, wherein the container main body has a thickness of 0.3 to 0.5 mm.

15. the container according to claim 13, wherein the amount of vinyl acetate in said non-cross-linked ethylene-vinyl acetate copolymer is 20 to 30% by weight.

16. The container according to claim 13, wherein the molding is formed by sealing a pair of sheets formed of the copolymer or a flat tube formed of the copolymer.

17. The container according to claim 13, wherein the molding is made by blow-molding the copolymer.

* * * * *